H. E. HEATH.
STEERING GEAR FOR WHEELED VEHICLES.
APPLICATION FILED JUNE 30, 1904.

918,546.

Patented Apr. 20, 1909.

Witnesses:
Ennis R. Gurney
Helen Orford

Inventor:
Harry E. Heath.
by Albert G. Davis
Att'y.

UNITED STATES PATENT OFFICE.

HARRY E. HEATH, OF LYNN, MASSACHUSETTS, ASSIGNOR TO GENERAL ELECTRIC COMPANY, A CORPORATION OF NEW YORK.

STEERING-GEAR FOR WHEELED VEHICLES.

No. 918,546.  Specification of Letters Patent.  Patented April 20, 1909.

Application filed June 30, 1904. Serial No. 214,721.

*To all whom it may concern:*

Be it known that I, HARRY E. HEATH, a citizen of the United States, residing at Lynn, county of Essex, State of Massachusetts, have invented certain new and useful Improvements in Steering-Gear for Wheeled Vehicles, of which the following is a specification.

This invention relates to the gearing used for steering automobiles and similar vehicles, and its object is to mount the steering wheel in such a way that when it is turned the vertical center of motion will be in the plane of the wheel, and thus reduce the effort required to turn it.

The invention consists in a stub axle for the wheel arranged normally in line with the fixed axle of the vehicle, and secured rigidly in an upright lever pivoted at its upper end to an arm which is pivotally mounted on the fixed axle. The axis of the pivot connecting the arm and the lever is oblique to the axis of the axle and its center line intersects that of the axle at the center of the wheel. The lower end of the lever is connected with the steering-handle, and when it is moved the stub axle on which the wheel is journaled is carried in a horizontal plane between stationary guides describing a circle whose center is always the center of the wheel. The latter is thus always turned on a vertical diameter in its plane.

Figure 1:
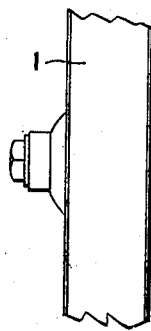
Figure 2:
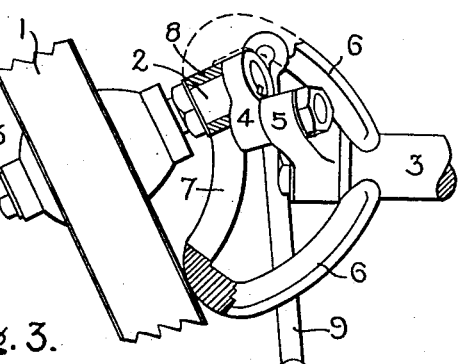
Figure 3:
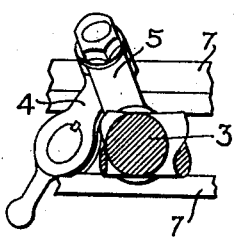
Figure 4:
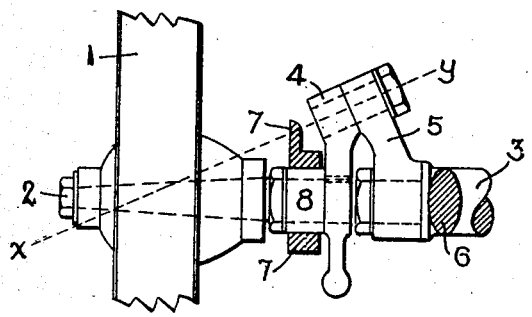
Figure 5:
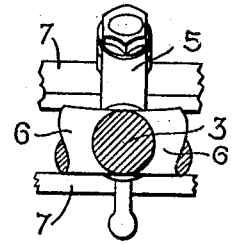

In the accompanying drawing, Figure 1 is a top plan view of my improved steering gear; Fig. 2 is a similar view, partly broken away, showing the wheel turned; Fig. 3 is a sectional rear elevation of part of Fig. 2; Fig. 4 is a longitudinal sectional elevation; and Fig. 5 is a sectional rear elevation of part of Fig. 4.

The steering wheel 1, which has a hub or nave of usual construction, is journaled on a short horizontal stub axle 2, preferably a forging. The axle is arranged normally in line with the main axle 3 of the vehicle and their adjacent ends are disposed at one side of a plane of the wheel. The stub axle is secured rigidly to an upright lever 4, whose upper end is pivoted to the upper end of an arm 5 which is pivotally mounted on the main axle so as to be capable of rotation thereon in a substantially vertical plane. The main axle is fixed, that is it does not rotate about its axis. The axis of the pivot between the arm and the lever is inclined to the axis of the axle, so that it intersects the latter at the center of the wheel, as shown by the dotted line $xy$ in Fig. 4. Secured to the fixed axle is a frame composed of diverging arms 6 whose outer ends are connected by two parallel guide-bars 7, preferably curved, concentric with the center of the wheel and receiving between them the inner end of the stub axle 2 just in front of the lever 4. The axle is preferably provided with a loose anti-friction sleeve 8 fitting between the guide bars. The lower portion of the lever 4 depends below the stub-axle, and is attached by a ball joint to a link 9 pivoted to a bell-crank lever 10 connected with the steering handle by a rod 11. By means of this, or equivalent mechanism, the lever can be swung to and fro, moving the stub axle along the guide-bars and turning the steering-wheel this way or that. The action is somewhat like that of two sectors of a circle hinged together along a radial edge, the other edge of one sector lying in the axis of the fixed axle, and the other edge of the other sector lying in the axis of the stub axle. When the sectors are spread open and flattened down, the radial edge representing the stub axle will move as a radius of the circle whose center is the center of the wheel, and thus the wheel will turn on a vertical diameter. The turning movement is thus effected with the least possible effort, and with the least wear on the tire.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a steering gear for vehicles, the combination of a main axle, a wheel, a stub axle beyond the end of the main axle on which the wheel is mounted, a fixed guide for the stub axle located between the end of the main axle and the wheel, and a pivotal connection between the two axles at a point laterally of the plane of the wheel.

2. In a steering gear for vehicles, the combination of a wheel, a stub axle on which the wheel is mounted, a fixed horizontal member concentric with the center of the wheel which supports and guides the stub axle, a main axle, and a pivotal connection between the axles located at one side of the plane of the wheel which permits the stub axle to turn about the center of said wheel.

3. In steering gear for vehicles, the combination with a steering wheel, of a fixed axle, an arm rotatable thereon in a vertical plane, a lever pivoted to said arm, and a stub axle secured to said lever, the axes of the pivot and the stub axle intersecting at the center of the wheel.

4. In steering gear for vehicles, the combination with a steering wheel, of a fixed axle, an arm rotatable thereon in a vertical plane, a lever pivoted to said arm, a stub axle secured to said lever, and a stationary guide for said stub axle.

5. In a steering gear for vehicles, the combination with a steering wheel, of a stub axle therefor, a fixed axle, an arm pivoted thereon, and a lever pivoted to the arm and rigidly secured to the stub axle, the axes of the fixed axle, the stub axle and the pivot always intersecting at the center of the wheel.

6. In steering gear for vehicles, the combination with a steering wheel, of a stub axle therefor, an upright lever secured to said axle, an arm pivoted to said lever, a fixed axle on which said arm is pivotally mounted, a frame secured to said fixed axle and comprising horizontal guide bars between which the stub axle passes, and means for actuating said lever.

7. In a steering gear for vehicles, the combination of a steering wheel, a stub axle therefor, a fixed axle on which the stub axle is supported at a point laterally of the plane of the wheel, means pivotally connecting the two axles at a point at one side of the plane of the wheel and adjacent said point of support, and means for actuating the stub axle to turn the wheel on its vertical axis.

8. In a steering gear for vehicles, the combination of a steering wheel, a stub axle for guiding the wheel and on which said wheel rotates, a fixed axle, a pivotal connection between the axles located at one side of the plane of the wheel, and a fixed guide located adjacent the inner end of the stub axle which supports said axle and guides it in a manner to turn the wheel on an axis coinciding with the center thereof.

9. In a steering gear for vehicles, the combination of a steering wheel, a stub axle on which the wheel is mounted, a fixed axle, an arc-shaped guide secured to the fixed axle at one side of the wheel whose center coincides with that of the wheel, a pivotal connection between the axles on the same side of said wheel, and means for moving the stub axle along the guide to turn the wheel about its own center.

In witness whereof I have hereunto set my hand this 28th day of June, 1904.

HARRY E. HEATH.

Witnesses:
DUGALD McK. McKILLOP,
JOHN A. McMANUS.